(12) United States Patent
Silvernail et al.

(10) Patent No.: US 8,481,473 B2
(45) Date of Patent: Jul. 9, 2013

(54) HIGH ALKALINE DETERGENT COMPOSITION WITH ENHANCED SCALE CONTROL

(75) Inventors: Carter Silvernail, Burnsville, MN (US); Erik C. Olson, Savage, MN (US); Elizabeth Kiesel, Hibbing, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 12/959,061

(22) Filed: Dec. 2, 2010

(65) Prior Publication Data

US 2011/0071065 A1    Mar. 24, 2011

Related U.S. Application Data

(62) Division of application No. 12/692,352, filed on Jan. 22, 2010, now abandoned.

(60) Provisional application No. 61/148,848, filed on Jan. 30, 2009.

(51) Int. Cl.
| | | |
|---|---|---|
| C11D 17/00 | (2006.01) | |
| C11D 3/37 | (2006.01) | |
| C11D 3/395 | (2006.01) | |
| C11D 3/00 | (2006.01) | |
| C11D 3/60 | (2006.01) | |
| C11D 7/00 | (2006.01) | |
| C11D 7/60 | (2006.01) | |
| C02F 5/08 | (2006.01) | |

(52) U.S. Cl.
USPC ........... 510/230; 510/224; 510/225; 510/231; 510/233; 510/247; 510/361; 510/533; 510/534

(58) Field of Classification Search
USPC ................. 510/219, 224, 225, 230, 231, 233, 510/247, 361, 533, 534
See application file for complete search history.

(56) References Cited

U.S. PATENT DOCUMENTS

| | | |
|---|---|---|
| 3,048,548 A | 8/1962 | Martin et al. |
| 3,159,581 A | 12/1964 | Kiehl |
| 3,213,030 A | 10/1965 | Diehl |
| 3,334,147 A | 8/1967 | Brunelle et al. |
| 3,400,148 A | 9/1968 | Quimby |
| 3,400,176 A | 9/1968 | Quimby |
| 3,422,021 A | 1/1969 | Roy |
| 3,422,137 A | 1/1969 | Quimby |
| 3,442,242 A | 5/1969 | Laskey et al. |
| 3,928,196 A | 12/1975 | Persinski et al. |
| 4,048,066 A | 9/1977 | Cuisia et al. |
| 4,575,425 A | 3/1986 | Boffardi et al. |
| 4,618,914 A | 10/1986 | Sato et al. |
| 4,640,793 A * | 2/1987 | Persinski et al. ............... 252/180 |
| 4,652,377 A | 3/1987 | Amjad |
| 4,711,740 A | 12/1987 | Carter et al. |
| 4,713,195 A | 12/1987 | Schneider |
| 4,714,113 A | 12/1987 | Mohnot et al. |
| 4,784,774 A | 11/1988 | Amjad et al. |
| 4,830,773 A | 5/1989 | Olson |
| 4,936,987 A | 6/1990 | Persinski et al. |
| 5,263,541 A | 11/1993 | Barthorpe et al. |
| 5,338,477 A | 8/1994 | Chen et al. |
| 5,399,285 A | 3/1995 | Kanluen |
| 5,490,942 A | 2/1996 | Kuczynski |
| 5,547,612 A | 8/1996 | Austin et al. |
| 6,210,600 B1 | 4/2001 | Zhou et al. |
| RE38,411 E | 2/2004 | Yamaguchi et al. |
| 6,846,452 B2 | 1/2005 | Kmec et al. |
| 6,867,173 B2 * | 3/2005 | Rodrigues ..................... 510/223 |
| 7,282,472 B2 | 10/2007 | Kapur et al. |
| 2002/0006891 A1 * | 1/2002 | Scepanski ..................... 510/447 |
| 2003/0091467 A1 | 5/2003 | Kmec et al. |
| 2003/0134765 A1 | 7/2003 | Kapur et al. |
| 2004/0014630 A1 * | 1/2004 | Lopez ............................ 510/445 |
| 2004/0106534 A1 | 6/2004 | Nitsch et al. |
| 2004/0127377 A1 | 7/2004 | Rodrigues |
| 2005/0020469 A1 * | 1/2005 | Rahse et al. ................... 510/444 |
| 2006/0219579 A1 * | 10/2006 | Miler ............................. 206/221 |
| 2007/0120094 A1 | 5/2007 | Yang et al. |
| 2008/0020470 A1 | 1/2008 | Keister |
| 2008/0303186 A1 * | 12/2008 | Lu ............................... 264/279.1 |

FOREIGN PATENT DOCUMENTS

| | | |
|---|---|---|
| EP | 0364067 | 4/1990 |
| EP | 364067 A2 * | 4/1990 |
| EP | 0712810 B1 | 5/2000 |
| EP | 0851022 B1 | 2/2007 |
| WO | WO 01/72941 | 10/2001 |
| WO | WO 2005/090541 | 9/2005 |

OTHER PUBLICATIONS

International Search Report and Written Opinion issued in PCT/IB2010/050398, mailed Oct. 21, 2010, 8 pages.

* cited by examiner

*Primary Examiner* — Harold Pyon
*Assistant Examiner* — Tanisha Diggs
(74) *Attorney, Agent, or Firm* — Andrew D. Sorensen; Shaoni L. Mitchell

(57) ABSTRACT

A detergent composition for preventing scale on various surfaces includes a threshold system, a caustic and a surfactant system. The threshold system includes a sulfonate/acrylate copolymer, an acrylate homopolymer and a phosphonoalkane carboxylic acid with a sulfonate/acrylate copolymer to acrylate homopolymer weight ratio of between about 2:1 to about 1:2. The pH of the detergent composition is between about 10 and about 13.

7 Claims, No Drawings

HIGH ALKALINE DETERGENT COMPOSITION WITH ENHANCED SCALE CONTROL

CROSS REFERENCE TO RELATED APPLICATIONS

This application is a divisional of U.S. patent application Ser. No. 12/692,352, filed Jan. 22, 2010, entitled High Alkaline Detergent Composition with Enhanced Scale Control, which claims the benefit of U.S. provisional application No. 61/148,848, filed Jan. 30, 2009, entitled High Alkaline Detergent Composition with Enhanced Scale Control, the disclosures of which are hereby incorporated by reference in their entireties for all purposes.

TECHNICAL FIELD

The present invention is related to the field of high alkaline detergents. In particular, the present invention is related to a low-phosphorus high alkaline detergent composition including a combination of three components as a threshold system for controlling scale.

BACKGROUND

Conventional detergents used in the vehicle care, warewashing and laundry industries include alkaline detergents. Alkaline detergents, particularly those intended for institutional and commercial use, in combination with the presence of hard water commonly result in heavy scale formation that is difficult to control, particularly in warewash applications at elevated temperatures. Alkaline detergents often contain polymers, phosphonates, phosphates, a chelating agents such as nitrilotriacetic acid (NTA) and ethylenediaminetetraacetic acid (EDTA) to help control scale, remove soils, and/or sequester metal ions such as calcium, magnesium and iron.

Chelating agents and/or threshold agents are often used in high alkaline detergents because of their ability to solubilize metal slats and/or prevent calcium, magnesium and iron salts from precipitating. When calcium, magnesium and iron salts precipitate, the crystals may attach to the surface being cleaned and cause undesirable effects. For example, calcium carbonate precipitation on the surface of ware can negatively impact the aesthetic appearance of the ware, giving an unclean look.

SUMMARY

The present invention includes a threshold system for preventing scale on various surfaces. The threshold system includes a sulfonate/acrylate copolymer, an acrylate homopolymer and a phosphonoalkane carboxylic acid.

In one embodiment, the present invention is a detergent concentrate including an alkalinity source constituting between about 1% and about 75% by weight of the detergent concentrate; a surfactant system constituting between about 0.05% and about 25% by weight of the detergent concentrate; and a threshold system constituting between about 0.0005% and about 30% by weight of the detergent concentrate. The threshold system includes a sulfonate/acrylate copolymer, an acrylate homopolymer and a phosphonoalkane carboxylic acid. The phosphonoalkane carboxylic acid constitutes between about 5% to about 30% by weight of the threshold system. The detergent composition has a pH of at least about 10.

In another embodiment, the present invention is a method of forming a detergent concentrate. The method includes mixing a threshold system with an alkalinity source and a surfactant to form a detergent concentrate. The threshold system includes a sulfonate/acrylate copolymer, an acrylate homopolymer and a phosphonoalkane carboxylic acid. In the threshold system, a weight ratio of the sulfonate/acrylate copolymer to the acrylate homopolymer is at least 1:1, and the phosphonoalkane carboxylic acid constitutes between about 5% to about 30% by weight of the threshold system. The detergent concentrate has a pH of at least about 10.

In yet another embodiment, the present invention is a method of removing scale during a wash cycle. The method includes diluting a detergent concentrate to form a detergent use solution. The detergent concentrate includes an alkalinity source constituting between about 1% and about 75% by weight of the detergent concentrate; a surfactant system constituting between about 0.05% and about 25% by weight of the detergent concentrate; and a threshold system constituting between about 0.0005% and about 30% by weight of the detergent concentrate. The threshold system includes a sulfonate/acrylate copolymer, an acrylate homopolymer and a phosphonoalkane carboxylic acid. The phosphonoalkane carboxylic acid constitutes between about 5% to about 30% by weight of the threshold system. The detergent concentrate has a pH of at least 10. The use solution formed by diluting the detergent concentrate is contacted with a substrate to be cleaned.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Detergent Composition

The present invention relates to a threshold system formed from a combination of three components: a sulfonated/acrylate copolymer, an acrylate homopolymer and phosphonoalkane carboxylic acid. The threshold system effectively reduces and/or inhibits scale formation, precipitation and/or substrate adhesion in hard water and may be used in conjunction with a high alkaline detergent composition in solid block form. Detergent compositions including the threshold system may be biodegradable and substantially free of aminocarboxylates such as NTA and EDTA, making the detergent composition particularly useful in cleaning applications where it is desired to use an environmentally friendly detergent. The detergent composition can be applied in any environment where it is desirable to remove soils, solubilize metal salts and prevent the precipitation of magnesium, calcium and/or iron salts. For example, the detergent composition can be used in vehicle care applications, warewashing applications, laundering applications and food and beverage applications. Such applications include, but are not limited to: machine and manual warewashing, presoaks, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, and industrial or household cleaners. Methods of using the detergent composition including the threshold system are also provided.

The detergent composition generally includes the threshold system, an alkalinity source and a surfactant or surfactant system. A suitable concentration range of the components in the detergent composition includes between approximately 0.0005% and about 30% by weight threshold system, between approximately 1% and approximately 75% by weight alkalinity source and between approximately 0.05% and approximately 25% by weight surfactant or surfactant system. A particularly suitable concentration range of the components in the detergent composition includes between approximately 0.0005% and about 20% by weight threshold system, between approximately 5% and approximately 50% by weight alkalinity source and between approximately 0.5% and between approximately 10% by weight surfactant or surfactant system. A more particularly suitable concentration range of the components in the detergent composition includes between approximately 0.0005% and about 10% by weight threshold system, between approximately 10% and approximately 30% by weight alkalinity source and between approximately 1% and approximately 5% by weight surfactant or surfactant system.

Examples of suitable sulfonate/acrylate copolymers include, but are not limited to, a copolymer of acrylic acid and 2-acrylamido-2-methylpropane sulfonic acid including their alkali metal salts having a molecular weight of 4500 and a copolymer of acrylic acid and 2-acrylamido-2-methylpropane sulfonic acid including their alkali metal saltshaving a molecular weight of 5000. Examples of commercially available sulfonate/acrylate copolymers include, but are not limited to, Acumer 2000, available from Rohm & Haas, Philadelphia, Pa., and Aquatreat AR-545, available from Alco Chemical, Chattanooga, Tenn. An example of a suitable acrylate homopolymer includes, but is not limited to, a homopolymer of acrylic acid having a molecular weight of 2000. Examples of commercially available acrylate homopolymers include, but are not limited to, Acumer 1000, available from Rohm & Haas, and Aquatreat AR-260, available from Alco Chemical. Examples of suitable phosphonoalkane carboxylic acids include, but are not limited to, 2-phosphonobutane-1,2,4-tricarboxylic acid and phosphino polycarboxylic acid having a molecular weight of 3600. An example of a particularly suitable phosphonoalkane carboxylic acid includes, but is not limited to, phosphonoalkane-1,2,4-tricarboxylic acid. Examples of commercially available phosphonoalkane carboxylic acids include, but are not limited to, Bayhibit AM, available from Lanxess, Pittsburgh, Pa., and Acusol 441, available from Rohm & Haas.

The threshold system includes a sulfonate/acrylate copolymer, an acrylate homopolymer and a phosphonoalkane carboxylic acid. The weight ratio of sulfonate/acrylate copolymer to acrylate homopolymer is between about 2:1 and about 1:2. Particularly, the weight ratio of sulfonate/acrylate copolymer to acrylate homopolymer is greater than about 1:1. More particularly, the weight ratio of sulfonate/acrylate copolymer to acrylate homopolymer is about 1:1. The weight ratio of acrylate homopolymer to phosphonoalkane carboxylic acid is between about 4:1 to 1:4. While the ratio of phosphonoalkane carboxylic acid to the sulfonate/acrylate copolymer and the acrylate homopolymer in the threshold system is not as critical as the ratio of sulfonate/acrylate copolymer to acrylate homopolymer, a minimum amount of phosphonoalkane carboxylic acid should be in the threshold system to produce the desired scale prevention properties. In one embodiment, the phosphonoalkane carboxylic acid constitutes between approximately 1% and approximately 50% by weight of the threshold system and particularly between approximately 5% and approximately 30% by weight of the threshold system.

The detergent composition also includes an alkalinity source, such as an alkali metal hydroxide, alkali metal carbonate, or alkali metal silicate. Examples of suitable alkalinity sources include, but are not limited to: sodium hydroxide, potassium hydroxide, sodium carbonate, potassium carbonate or a mixture of alkali metal sodium hydroxide and alkali metal carbonate. The alkalinity source controls the pH of the resulting solution when water is added to the detergent composition to form a use solution. The pH of the use solution must be maintained in the alkaline range in order to provide sufficient detergency properties. In one embodiment, the pH of the use solution is between approximately 10 and approximately 13. Particularly, the pH of the use solution is between about 10 and about 12. In another embodiment, the pH of the use solution is between approximately 10.3 and approximately 13. Particularly, the pH of the use solution is between about 10.3 and about 12. If the pH of the use solution is too low, for example, below approximately 10, the use solution may not provide adequate detergency properties. If the pH of the use solution is too high, for example, above approximately 13, the use solution may be too alkaline and attack or damage the surface to be cleaned.

The alkalinity source may also function as a hydratable salt to form the solid cast. The hydratable salt can be referred to as substantially anhydrous. By substantially anhydrous, it is meant that the component contains less than about 2% by weight water based upon the weight of the hydratable component. The amount of water can be less than about 1% by weight, and can be less than about 0.5% by weight. There is no requirement that the hydratable component be completely anhydrous.

The detergent composition also includes water of hydration to hydrate the alkalinity source/hydratable salt. It should be understood that the reference to water includes water of hydration and free water. The phrase "water of hydration" refers to water which is somehow attractively bound to a non-water molecule. An exemplary form of attraction includes hydrogen bonding. In addition to hydrating the hydratable salt, the water of hydration also functions to increase the viscosity of the mixture during processing and cooling to prevent separation of the components. The amount of water of hydration in the detergent composition will depend on the alkalinity source/hydratable salt.

The detergent composition also includes a surfactant or surfactant system. A variety of surfactants may be used, including anionic, nonionic, cationic, and zwitterionic surfactants. For a discussion of surfactants, see Kirk-Othmer, Encyclopedia of Chemical Technology, Third Edition, volume 8, pages 900-912, which is incorporated herein by reference.

Examples of suitable anionic surfactants useful in the detergent composition, include, but are not limited to: carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like. Some particularly suitable anionic surfactants include, but are not limited to: sodium alkylarylsulfonate, alpha-olefinsulfonate, and fatty alcohol sulfates.

Nonionic surfactants useful in the detergent composition include those having a polyalkylene oxide polymer as a portion of the surfactant molecule. Examples of suitable nonionic surfactants include, but are not limited to: chlorine-, benzyl-, methyl-, ethyl-, propyl, butyl- and alkyl-capped polyethylene glycol ethers of fatty alcohols; polyalkylene oxide free nonionics such as alkyl polyglucosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer. Examples of suitable commercially available nonionic surfactants include, but are not limited to: PLURONIC, available from BASF Corporation, Florham Park, N.J. and ABIL B8852, available from Goldschmidt Chemical Corporation, Hopewell, Va.

Cationic surfactants useful for inclusion in the detergent composition include, but are not limited to: amines such as primary, secondary and tertiary amines with C18 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl(C12-C18)dimethylbenzyl ammonium chloride, n-tetradecyldimethylbenzylammonium chloride monohydrate, and naphthalene-substituted quaternary ammonium chlorides such as dimethyl-1-naphthylmethylammonium chloride. For a more extensive list of surfactants, see McCutcheon's Emulsifiers and Detergents, which is incorporated herein by reference.

Additional Functional Materials

The detergent composition may contain other functional materials that provide desired properties and functionalities to the detergent composition. For the purpose of this application, the term "functional materials" includes a material that when dispersed or dissolved in a use and/or concentrate solution, such as an aqueous solution, provides a beneficial property in a particular use. Examples of such functional materials include, but are not limited to: organic detergents, cleaning agents; rinse aids; bleaching agents; sanitizers/anti-microbial agents; activators; detergent builders or fillers; defoaming agents, anti-redeposition agents; dyes/odorants; secondary hardening agents/solubility modifiers; or the like, or a broad variety of other functional materials, depending upon the desired characteristics and/or functionality of the composition.

In particular, the detergent composition may include an aluminum gluconate builder as disclosed in co-pending application titled "Development of an Aluminum Hydroxycarboxylate Builder" which is incorporated herein by reference and filed on the same day herewith. Some more particular examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications.

Rinse Aids

The detergent composition can optionally include a rinse aid composition, for example a rinse aid formulation containing a wetting or sheeting agent combined with other optional ingredients in a solid composition made using the binding agent. The rinse aid components are capable of reducing the surface tension of the rinse water to promote sheeting action and/or to prevent spotting or streaking caused by beaded water after rinsing is complete, for example in warewashing processes. Examples of sheeting agents include, but are not limited to: polyether compounds prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule.

Bleaching Agents

The detergent composition can optionally include a bleaching agent for lightening or whitening a substrate, and can include bleaching compounds capable of liberating an active halogen species, such as $Cl_2$, $Br_2$, —OCl— and/or —OBr—, or the like, under conditions typically encountered during the cleansing process. Examples of suitable bleaching agents include, but are not limited to: chlorine-containing compounds such as chlorine, a hypochlorite or chloramines. Examples of suitable halogen-releasing compounds include, but are not limited to: alkali metal dichloroisocyanurates, alkali metal hypochlorites, monochloramine, and dichloroamine. Encapsulated chlorine sources may also be used to enhance the stability of the chlorine source in the composition (see, for example, U.S. Pat. Nos. 4,618,914 and 4,830,773, the disclosures of which are incorporated by reference herein). The bleaching agent may also include an agent containing or acting as a source of active oxygen. The active oxygen compound acts to provide a source of active oxygen and may release active oxygen in aqueous solutions. An active oxygen compound can be inorganic, organic or a mixture thereof. Examples of suitable active oxygen compounds include, but are not limited to: peroxygen compounds, peroxygen compound adducts, hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine.

Sanitizers/Anti-Microbial Agents

The detergent composition can optionally include a sanitizing agent (or antimicrobial agent). Sanitizing agents, also known as antimicrobial agents, are chemical compositions that can be used to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, anilides, organosulfur and sulfur-nitrogen compounds and miscellaneous compounds.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Examples of suitable antimicrobial agents include, but are not limited to, phenolic antimicrobials such as pentachlorophenol; orthophenylphenol; chloro-p-benzylphenols; p-chloro-m-xylenol; quaternary ammonium compounds such as alkyl dimethylbenzyl ammonium chloride; alkyl dimethylethylbenzyl ammonium chloride; octyl decyldimethyl ammonium chloride; dioctyl dimethyl ammonium chloride; and didecyl dimethyl ammonium chloride. Examples of suitable halogen containing antibacterial agents include, but are not limited to: sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, and tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action.

Activators

In some embodiments, the antimicrobial activity or bleaching activity of the detergent composition can be enhanced by the addition of a material which, when the detergent composition is placed in use, reacts with the active oxygen to form an activated component. For example, in some embodiments, a peracid or a peracid salt is formed. For example, in some embodiments, tetraacetylethylene diamine can be included within the detergent composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof. In some embodiments, an activator for an active oxygen compound combines with the active oxygen to form an antimicrobial agent.

In some embodiments, the detergent composition is in the form of a solid block, and an activator material for the active oxygen is coupled to the solid block. The activator can be coupled to the solid block by any of a variety of methods for coupling one solid detergent composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the detergent composition, such as by a plastic or shrink wrap or film.

Detergent Builders or Fillers

The detergent composition can optionally include a minor but effective amount of one or more of a detergent filler which does not necessarily perform as a cleaning agent per se, but may cooperate with a cleaning agent to enhance the overall cleaning capacity of the composition. Examples of suitable fillers include, but are not limited to: sodium sulfate, sodium chloride, starch, sugars, and C1-C10 alkylene glycols such as propylene glycol.

pH Buffering Agents

Additionally, the detergent composition can be formulated such that during use in aqueous operations, for example in aqueous cleaning operations, the wash water will have a desired pH. For example, compositions designed for use in providing a presoak composition may be formulated such that during use in aqueous cleaning operations the wash water will have a pH in the range of about 6.5 to about 12, and in some embodiments, in the range of about 7.5 to about 11. Liquid product formulations in some embodiments have a (10% dilution) pH in the range of about 7.5 to about 11.0, and in some embodiments, in the range of about 7.5 to about 9.0.

For example, a souring agent may be added to the detergent composition such that the pH of the textile approximately matches the proper processing pH. The souring agent is a mild acid used to neutralize residual alkalines and reduce the pH of the textile such that when the garments come into contact with human skin, the textile does not irritate the skin. Examples of suitable souring agents include, but are not limited to: phosphoric acid, formic acid, acetic acid, hydrofluorosilicic acid, saturated fatty acids, dicarboxylic acids, tricarboxylic acids, and any combination thereof. Examples of saturated fatty acids include, but are not limited to: those having 10 or more carbon atoms such as palmitic acid, stearic acid, and arachidic acid (C20). Examples of dicarboxylic acids include, but are not limited to: oxalic acid, tartaric acid, glutaric acid, succinic acid, adipic acid, and sulfamic acid. Examples of tricarboxylic acids include, but are not limited to: citric acid and tricarballylic acids. Examples of suitable commercially available souring agents include, but are not limited to: TurboLizer, Injection Sour, TurboPlex, AdvaCare 120 Sour, AdvaCare 120 Sanitizing Sour, CarboBrite, and Econo Sour, all available from Ecolab Inc., St. Paul, Minn.

Defoaming Agents

The detergent composition can optionally include a minor but effective amount of a defoaming agent for reducing the stability of foam. Examples of suitable defoaming agents include, but are not limited to: silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

The detergent composition can optionally include an anti-redeposition agent capable of facilitating sustained suspension of soils in a detergent solution and preventing the removed soils from being redeposited onto the substrate being cleaned. Examples of suitable anti-redeposition agents include, but are not limited to: fatty acid amides, fluorocarbon surfactants, complex phosphate esters, polyacrylates, styrene maleic anhydride copolymers, and cellulosic derivatives such as hydroxyethyl cellulose, hydroxypropyl cellulose.

Stabilizing Agents

The detergent composition may also include stabilizing agents. Examples of suitable stabilizing agents include, but are not limited to: borate, calcium/magnesium ions, propylene glycol, and mixtures thereof.

Dispersants

The detergent composition may also include dispersants. Examples of suitable dispersants that can be used in the solid detergent composition include, but are not limited to: maleic acid/olefin copolymers, polyacrylic acid, and mixtures thereof.

Dyes/Odorants

Various dyes, odorants including perfumes, and other aesthetic enhancing agents may also be included in the detergent composition. Examples of suitable commercially available dyes include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Examples of suitable fragrances or perfumes include, but are not limited to: terpenoids such as citronellol, aldehydes such as amyl cinnamaldehyde, a jasmine such as C1S-jasmine or jasmal, and vanillin.

Water Repellency Agents

The detergent composition can include water repellency agents that can be applied to textile to enhance water repellent properties. Examples of suitable water repellenancy agents include, but are not limited to: perfluoroacrylate copolymers, hydrocarbon waxes, and polysiloxanes.

Hardening Agents/Solubility Modifiers

The detergent composition may include a minor but effective amount of a hardening agent. Examples of suitable hardening agents include, but are not limited to: an amide such stearic monoethanolamide or lauric diethanolamide, an alkylamide, a solid polyethylene glycol, a solid EO/PO block copolymer, starches that have been made water-soluble through an acid or alkaline treatment process, and various inorganics that impart solidifying properties to a heated composition upon cooling. Such compounds may also vary the solubility of the composition in an aqueous medium during use such that the cleaning agent and/or other active ingredients may be dispensed from the solid composition over an extended period of time.

Other Ingredients

A wide variety of other ingredients useful in providing the particular composition being formulated to include desired properties or functionality may also be included. For example, the detergent compositions may include other active ingredients, cleaning enzymes, carriers, processing aids, and the like.

Embodiments

The present invention relates to a solid block detergent composition including the threshold system, an alkalinity source, and a surfactant or surfactant system. For example, the detergent composition is provided as a cast solid including the threshold system. It should be understood that the term "solid" refers to the state of the detergent composition under the expected conditions of storage and use of a solid detergent composition. In general, it is expected that the detergent composition will remain a solid when provided at a temperature of up to about 100° F. or lower than about 120° F.

Exemplary ranges for components of the detergent composition when provided as a solid block warewashing composition are shown in Table 1.

TABLE 1

| Component | First Exemplary Range (wt %) | Second Exemplary Range (wt %) | Third Exemplary Range (wt %) |
| --- | --- | --- | --- |
| Water | 0-50 | 1-30 | 5-20 |
| Alkaline Source | 1-75 | 5-50 | 10-30 |
| Sulfonate/Acrylate Copolymer | 0.0001-15 | 0.0001-10 | 0.0001-5 |
| Acrylate Homopolymer | 0.0001-15 | 0.0001-10 | 0.0001-5 |
| Phosphonoalkane Carboxylic Acid | 0.0001-5 | 0.0001-3.5 | 0.0001-2 |
| Surfactant | 0.05-15 | 0.5-10 | 1-5 |
| Filler | 1-60 | 1-40 | 1-20 |
| Chelating Agent | 1-50 | 1-30 | 1-15 |
| Bleach | 0-55 | 5-45 | 10-35 |
| Silicate | 0-35 | 5-25 | 10-15 |
| Dispersant | 0-10 | 0.001-5 | 0.01-1 |
| Enzyme | 0-15 | 1-10 | 2-5 |
| Corrosion Inhibitor | 0.01-15 | 0.05-10 | 1-5 |
| Fragrance | 0-10 | 0.01-5 | 0.1-2 |
| Dye | 0-1 | 0.001-0.5 | 0.01-0.25 |

The detergent compositions may include concentrate compositions or may be diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as the use composition. The use solution can include additional functional ingredients at a level suitable for cleaning, rinsing, or the like.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10000 concentrate to water. Particularly, the concentrate is diluted at a ratio of between about 1:100 and about 1:5000 concentrate to water. More particularly, the concentrate is diluted at a ratio of between about 1:250 and about 1:2000 concentrate to water.

It should be understood that the concentration of the threshold system and the individual components of the threshold system in the detergent composition will vary depending on whether the detergent composition is provided as a concentrate or as a use solution. For example, a suitable concentration range of the threshold system in a concentrate is between approximately 0.1% and approximately 30% by weight, particularly between approximately 1% and approximately 20% by weight and more particularly between approximately 1% and approximately 10% by weight. A suitable concentration range of the sulfonate/acrylate copolymer in a concentrate is between approximately 1% and approximately 15% by weight, particularly between approximately 1% and approximately 10% by weight and more particularly between approximately 1% and approximately 5% by weight. A suitable concentration range of the acrylate homopolymer in a concentrate is between approximately 1% and approximately 15% by weight, particularly between approximately 1% and approximately 10% by weight and more particularly between approximately 1% and approximately 5% by weight. A suitable concentration range of the phosphonoalkane carboxylic acid in a concentrate is between approximately 0.1% and approximately 5% by weight, particularly between approximately 0.1% and approximately 3.5% by weight and more particularly between approximately 0.1% and approximately 2% by weight.

A suitable concentration range of the threshold system in a use solution is between approximately 0.0005% and approximately 0.15% by weight, particularly between approximately 0.0005% and approximately 0.075% by weight and more particularly between 0.0005% and approximately 0.04% by weight. A suitable concentration range of the sulfonate/acrylate copolymer in a use solution is between approximately 0.0001% and approximately 0.05% by weight and particularly between approximately 0.0001% and approximately 0.02% by weight. A suitable concentration range of the acrylate homopolymer in a use solution is between approximately 0.0001% and approximately 0.05% by weight and particularly between approximately 0.0001% and approximately 0.02% by weight. A suitable concentration range of the phosphonoalkane carboxylic acid in a use solution is between approximately 0.0001% and approximately 0.02% by weight and particularly between approximately 0.0001% and approximately 0.01% by weight.

The use composition can have a solids content that is sufficient to provide the desired level of detersive properties while avoiding wasting the detergent composition. The solids concentration refers to the concentration of the non-water components in the use composition. In an embodiment when the composition is provided as a use solution, the use composition can have a solids content of between approximately 50 and approximately 5,000 parts per million (ppm) and provide a desired level of cleaning Particularly, the use solution can have a solids content of between approximately 200 and approximately 3,000 ppm.

The concentrate may be diluted with water at the location of use to provide the use solution. The use solution is then applied onto the surface for an amount of time sufficient to remove soils from the surface. In an exemplary embodiment, the use solution remains on the surface of at least approximately 5 seconds to effectively remove the soils from the surface. The use solution is then rinsed from the surface.

The detergent composition can be provided in any of a variety of embodiments. In one embodiment, the phosphorus content does not exceed 0.5% of the concentrated formula of the detergent composition. In another embodiment, the detergent composition is substantially free of aminocarboxylates such as nitrilotriacetic acid (NTA) and ethylenediaminetetraacetic acid (EDTA) to make the solid detergent composition more environmentally acceptable. However, the detergent composition may contain between about 0.1% and about 30% by weight of a biodegradable aminocarboxylate, particularly between about 0.1% and about 20% by weight of a biodegradable aminocarboxylate, and more particularly between about 0.1% and about 15% by weight of a biodegradable aminocarboxylate. Examples of biodegradable aminocarboxylates include, but are not limited to, hydroxyethyliminodiacetic acid disodium salt (HEIDA) available from DOW Chemical Company under the tradename VERSENE HEIDA, methylglycinediacetic acid (MGDA) trisodium salt available from BASF Corporation under the tradename Trilon M, and glutamic acid-N,N-diacetic acid tetrasodium salt available from Akzo Nobel under the tradename Dissolvine GL. Substantially NTA and/or EDTA-free refers to a composition to which NTA and/or EDTA are present through contamination, the level of NTA and/or EDTA in the resulting composition is less than approximately 10 wt %, less than approximately 5 wt %, less than approximately 1 wt %, less than approximately 0.5 wt %, less than approximately 0.1 wt %, and often less than approximately 0.01 wt %. When diluted to a use solution, the detergent composition includes NTA and EDTA concentrations of less than approximately 100 ppm, particularly less than approximately 10 ppm, and most particularly less than approximately 1 ppm. When the detergent composition is aminocarboxylate-free, the detergent composition is also compatible with chlorine, which functions as an anti-redeposition and stain-removal agent.

The detergent composition is provided as a cast solid in order to provide a highly concentrated product that can be sprayed by use of a dispenser and water source. The detergent composition, including the threshold system, alkalinity source, surfactant or surfactant system and other functional ingredients are mixed at elevated temperatures. The mixture is mixed for an amount of time sufficient to partially or completely dissolve the components to form a final, homogeneous composition. In an exemplary embodiment, the components of the detergent composition are mixed for approximately 10 minutes. The mixture is then poured into molds to harden into a solid block. The solidification can involve one or more physico-chemical mechanisms, including "freezing", precipitation from solution. etc.

After the mixture has solidified, the cast composition is surrounded by, and in contact with, the mold on all sides except for its upper surface, which remains exposed. The combination of the cast detergent and the disposable mold in which it was formed provides an article of commerce capable of dispensing dissolved solids from substantially only one surface, the upper surface which was the free or unsupported surface in the mold. In certain embodiments, the solid detergent composition is provided as a solid having a mass of about 1 pound to about 30 pounds.

The cast detergent composition may be left in the disposable mold in which it was cast. Alternatively, the cast detergent can be demolded and inserted in an inexpensive container or receptacle which has substantially the same configuration as the mold, since in either case the cast detergent is surrounded on all but one surface, as described previously. The thus-surrounded cast detergent is used by placing its exposed surface in a drainable position (preferably fixed) within a detergent dispensing apparatus. A fixed drainable position is one in which the aforementioned unsurrounded, exposed surface is fixed with respect to the horizontal and a potential impinging spray of liquid such that the unsurrounded, exposed surface permits gravity flow therefrom, either because of an inclination from the horizontal by a few degrees (e.g. by) 10°-90° or by inclination beyond 90°, i.e. partial or total inversion up to and including a totally inverted or downward-facing position. A spray of liquid impinging on the drainable (inclined or inverted) surface, suitably controlled in duration, provides a draining action or gravity flow of liquid detergent which drains downward off of the drainable surface to the washing machine into which the detergent is to be dispensed. Control over the duration of impingement (hence the duration of downward flow) has the effect of controlling the concentration of detergent in the washing machine. The dispensing apparatus is not a water-in-reservoir type, since it dispenses the flow of liquid detergent about as fast as this flow is formed by the spraying action. In one embodiment, the solid block detergent composition is used in a wash cycle of a warewashing machine having a water source temperature of between about 140 and about 185 degrees Fahrenheit and particularly between about 145 and about 160 degrees Fahrenheit.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

100 Cycle Warewashing Test

To determine the ability of various detergent compositions to remove spots and film from ware, 6 Libbey glasses were prepared by removing all film and foreign material from the surfaces of the glasses. The dishmachine was then filled with an appropriate amount of water and the water was tested for hardness. After recording the value, the tank heaters were turned on. The dishmachine was then turned on and wash/rinse cycles were run through the machine until a wash temperature of between about 150° F. and about 160° F. and a rinse temperature of between about 175° F. and about 190° F. was reached. The controller was then set to dispense an appropriate amount of detergent into the wash tank. The solution in the wash tank was titrated to verify detergent concentration.

The 6 clean glasses were placed diagonally in a Raburn rack and four plastic tumblers were placed off-diagonally in the Raburn rack (see figure below for arrangement) and the rack was placed inside the dishmachine. (P=plastic tumbler; G=glass tumbler).

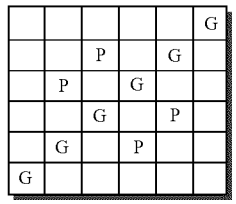

The 100 cycle test was then started. At the beginning of each wash cycle, the appropriate amount of detergent was automatically dispensed into the warewash machine to maintain the initial detergent concentration. The detergent concentration was controlled by conductivity.

At the completion of each cycle, the proper amount of detergent was dispensed into the warewash machine to maintain the initial concentration. Upon completion of 100 cycles, the rack was removed from the warewash machine and the glasses and plastic tumbles were allowed to dry overnight. The glasses and plastic tumbles were then graded for spot and film accumulation using a strong light source. The amounts of spots and films on the glasses were rated on a scale of 1 to 5. A rating of 1 indicated no spots and no films. A rating of 2 indicated a random amount of spots that cover less than about a quarter of the surface and a trace amount of film that was barely perceptible under intense spot light conditions. A rating of 3 indicated that about a quarter of the surface was covered with spots and a slight film was present when held up to a florescent light source. A rating of 4 indicated that about half of the surface was covered with spots and a moderate amount of film was present such that the surface appeared hazy when held up to a florescent light source. A rating of 5 indicated that the entire surface was coated with spots and a heavy amount of filming was present such that the surface appears cloudy when held up to a florescent light source.

The ratings of the glasses were averaged to determine an average glass rating and the ratings of the plastic tumblers were averaged to determine an average plastic rating. The ratings of the individual glasses and plastic tumblers were also averaged to determine an average spot and film rating for the threshold system.

Examples 1, 2 and 3 and Comparative Examples A, B, C, D, E, F, G, H and I

Examples 1, 2 and 3 included detergent compositions using the threshold system of the present invention. The compositions of Examples 1-3 included a sulfonate/acrylate copolymer, an acrylate homopolymer and a phosphonoalkane carboxylic acid at varying ratios. The sulfonate/acrylate copolymer used was Aquatreat AR-545, an acrylic acid/2-acrylamido-2-methylpropane sulfonic acid copolymer having a molecular weight of 5000 grams per mole, available from Alco Chemical, Chattanooga, Tenn. The acrylate homopolymer used was Aquatreat AR-260, an acrylic acid homopolymer having a molecular weight of 2000 grams per mole, available from Alco Chemical. The phosphonoalkane carboxylic acid used was phosphonobutane-1,2,4-tricarboxylic acid available under the trade name Bayhibit AM from Lanxess, Pittsburgh, Pa. The compositions of Examples 1-3 also included, by weight, 28% sodium hydroxide beads, 10% sodium hydroxide (50% active), 30% dense ash, 13.9% sodium sulfate and balance water.

Comparative Examples A-I also included varying ratios of the sulfonate/acrylate copolymer, the acrylate homopolymer and the phosphonoalkane carboxylic acid. In particular, Comparative Example A included only sulfonate/acrylate copolymer; Comparative Example B included only acrylate homopolymer; Comparative Example C included only phosphonoalkane carboxylic acid; Comparative Examples D and E included sulfonate/acrylate copolymer and acrylate homopolymer; Comparative Examples F and G included sulfonate/acrylate copolymer and phosphonoalkane carboxylic acid; and Comparative Examples H and I included acrylate homopolymer and phosphonoalkane carboxylic acid. Similar to the compositions of Examples 1-3, the compositions of Comparative Examples A-I also included, by weight, 28% sodium hydroxide beads, 10% sodium hydroxide (50% active), 30% dense ash, 13.9% sodium sulfate and balance water.

The component concentrations of the detergent compositions of Examples 1-3 and Comparative Examples A-I are illustrated below in Table 2.

TABLE 2

|  | Sulfonate/Acrylate copolymer (wt %) | Acrylate homopolymer (wt %) | Phosphonoalkane carboxylic acid (wt %) |
| --- | --- | --- | --- |
| Example 1 | 8.9 | 4.2 | 1.6 |
| Example 2 | 4.4 | 8.3 | 1.6 |
| Example 3 | 4.9 | 4.6 | 4.8 |
| Comparative Example A | 15.1 | 0 | 0 |
| Comparative Example B | 0 | 14.2 | 0 |

TABLE 2-continued

|  | Sulfonate/<br>Acrylate<br>copolymer<br>(wt %) | Acrylate<br>homopolymer<br>(wt %) | Phosphonoalkane<br>carboxylic<br>acid<br>(wt %) |
|---|---|---|---|
| Comparative Example C | 0 | 0 | 13.6 |
| Comparative Example D | 9.8 | 5 | 0 |
| Comparative Example E | 5.3 | 9.2 | 0 |
| Comparative Example F | 13.3 | 0 | 1.6 |
| Comparative Example G | 6.2 | 0 | 8 |
| Comparative Example H | 0 | 12.5 | 1.6 |
| Comparative Example I | 0 | 5.8 | 8 |

Table 3 lists the ratio of the three components of the threshold system, the glass scale rating, the plastic scale rating and the average scale rating for the compositions of Examples 1-3 and Comparative Examples A-I. Generally, an average rating of 3 or above is considered unacceptable.

TABLE 3

|  | Ratio of sulfonate/<br>acrylate copolymer to<br>acrylate homopolymer<br>to phosphonoalkane<br>carboxylic acid | Glass | Plastic | Average |
|---|---|---|---|---|
| Example 1 | 8.9:4.2:1.6 | 2.2 | 2.1 | 2.2 |
| Example 2 | 4.4:8.3:1.6 | 2.7 | 2.6 | 2.7 |
| Example 3 | 4.9:4.6:4.8 | 2.3 | 2 | 2.2 |
| Comparative Example A | 15.1:0:0 | 5 | 4.9 | 5 |
| Comparative Example B | 0:14.2:0 | 4 | 3.6 | 3.8 |
| Comparative Example C | 0:0:13.6 | 5 | 5 | 5 |
| Comparative Example D | 9.8:5:0 | 2.3 | 5 | 3.7 |
| Comparative Example E | 5.3:9.2:0 | 3.2 | 5 | 4.1 |
| Comparative Example F | 13.3:0:1.6 | 3.9 | 2 | 3 |
| Comparative Example G | 6.2:0:8 | 2.1 | 5 | 3.5 |
| Comparative Example H | 0:12.5:1.6 | 2.4 | 5 | 3.7 |
| Comparative Example I | 0:5.8:8 | 2.4 | 5 | 3.7 |

As can be seen in Table 3, the compositions of Examples 1, 2 and 3, which included all three components at varying ratios, were more effective at removing scale than compositions that included only one or two of the components. In particular, the composition of Example 1, which had a sulfonate/acrylate copolymer to acrylate homopolymer to phosphonoalkane carboxylic acid ratio of about 2:1:0.33 had an average rating of 2.2; the composition of Example 2, which had a sulfonate/acrylate copolymer to acrylate homopolymer to phosphonoalkane carboxylic acid ratio of about 1:2:0.33 had an average rating of 2.7; and the composition of Example 3, which had a sulfonate/acrylate copolymer to acrylate homopolymer to phosphonoalkane carboxylic acid ratio of about 1:1:1 had an average rating of 2.2. While the compositions including all three components were effective at various ratios, the compositions of Examples 1 and 3, which had a sulfonate/acrylate copolymer to acrylate homopolymer ratio of about 1:1 or greater were more effective at removing scale from glass and plastic.

By contrast, the compositions that included only one or two of the components had unacceptable average scale ratings. The compositions of Comparative Examples A, B and C, each of which included only one of the components, had unacceptable average scale ratings of 3.8 or higher. While the compositions of Comparative Examples D and E, which did not include any phosphonoalkane carboxylic acid, resulted in acceptable glass scale ratings, they resulted in unacceptable plastic and average scale ratings. The compositions of Comparative Examples F and G, which included only sulfonate/acrylate copolymer and phosphonoalkane carboxylic acid, also had unacceptable average scale ratings. Lastly, the compositions of Comparative Examples H and I, which included only acrylate homopolymer and phosphonoalkane carboxylic acid, effectively removed scale from glass but removed substantially no scale from plastic. Overall, the average scale ratings of the compositions of Comparative Examine H and I were unacceptable.

Examples 1, 2 and 3 and Comparative Examples J, K, L, M, N, O, P, Q, R

After it was determined that a phosphonoalkane carboxylic acid in combination with a sulfonate/acrylate copolymer and an acrylate homopolymer was effective at preventing scale on glass and plastic (Examples 1-3), the sulfonate/acrylate copolymer and acrylate homopolymer were combined with other phosphonates to determine whether other phosphonates would be as effective.

In particular, Comparative Examples J, K and L included the sulfonate/acrylate copolymer, the acrylate homopolymer and 1-hydroxy ethylidene-1,1-diphosphonic acid (60% active) at varying ratios. Comparative Examples M, N and O included the sulfonate/acrylate copolymer, the acrylate homopolymer, diethylenetriamine penta(methylenephosphonic) acid (25% active) and sodium salt. Comparative Examples P, Q and R included the sulfonate/acrylate copolymer, the acrylate homopolymer and hexamethylenediamine tetra(methylenephosphonic) acid potassium salt (23% active in the acid form). Similar to the compositions of Examples 1-3, the compositions of Comparative Examples J-R also included, by weight, 28% sodium hydroxide beads, 10% sodium hydroxide (50%), 30% dense ash, 13.9% sodium sulfate and balance water.

The component concentrations of the compositions of Examples 1-3 and Comparative Examples J-R are illustrated below in Table 4.

TABLE 4

|  | Sulfonate/<br>Acrylate<br>copolymer | Acrylate<br>homopolymer | Phosphonoalkane<br>carboxylic acid | 1-hydroxy ethylidene-<br>1,1-diphosphonic acid | Diethylenetriamine<br>penta(methylene-<br>phosphonic) acid | Hexamethylenediamine<br>tetra(methylene-<br>phosphonic) acid |
|---|---|---|---|---|---|---|
| Example 1 | 8.9 | 4.2 | 1.6 | 0 | 0 | 0 |
| Example 2 | 4.4 | 8.3 | 1.6 | 0 | 0 | 0 |
| Example 3 | 4.9 | 4.6 | 4.8 | 0 | 0 | 0 |
| Comp. Ex. J | 8.9 | 4.2 | 0 | 1.3 | 0 | 0 |
| Comp. Ex. K | 4.4 | 8.3 | 0 | 1.3 | 0 | 0 |
| Comp. Ex. L | 4.9 | 4.6 | 0 | 4 | 0 | 0 |

TABLE 4-continued

|  | Sulfonate/ Acrylate copolymer | Acrylate homopolymer | Phosphonoalkane carboxylic acid | 1-hydroxy ethylidene-1,1-diphosphonic acid | Diethylenetriamine penta(methylene-phosphonic) acid | Hexamethylenediamine tetra(methylene-phosphonic) acid |
|---|---|---|---|---|---|---|
| Comp. Ex. M | 8.9 | 4.2 | 0 | 0 | 3.2 | 0 |
| Comp. Ex. N | 4.4 | 8.3 | 0 | 0 | 3.2 | 0 |
| Comp. Ex. O | 4.9 | 4.6 | 0 | 0 | 9.6 | 0 |
| Comp. Ex. P | 8.9 | 4.2 | 0 | 0 | 0 | 3.5 |
| Comp. Ex. Q | 4.4 | 8.3 | 0 | 0 | 0 | 3.5 |
| Comp. Ex. R | 4.9 | 4.6 | 0 | 0 | 0 | 10.4 |

Table 5 lists the ratio of the three components of the threshold system, the glass scale rating, the plastic scale rating, and the average scale rating for the compositions of Examples 1-3 and Comparative Examples J-R. Generally, an average rating of 3 or above is generally considered unacceptable.

TABLE 5

|  | Ratio of sulfonate/acrylate copolymer to acrylate homopolymer to phosphonate | Glass | Plastic | Average |
|---|---|---|---|---|
| Example 1 | 8.9:4.2:1.6 | 2.2 | 2.1 | 2.2 |
| Example 2 | 4.4:8.3:1.6 | 2.7 | 2.6 | 2.7 |
| Example 3 | 4.9:4.6:4.8 | 2.3 | 2 | 2.2 |
| Comparative Example J | 8.9:4.2:1.3 | 3 | 5 | 4 |
| Comparative Example K | 4.4:8.3:1.3 | 3.6 | 2.4 | 3 |
| Comparative Example L | 4.9:4.6:4 | 3.7 | 5 | 4.4 |
| Comparative Example M | 8.9:4.2:3.2 | 3.1 | 5 | 4.1 |
| Comparative Example N | 4.4:8.3:3.2 | 3.7 | 5 | 4.4 |
| Comparative Example O | 4.9:4.6:9.6 | 3.3 | 5 | 4.2 |
| Comparative Example P | 8.9:4.2:3.5 | 4.7 | 5 | 4.9 |
| Comparative Example Q | 4.4:8.3:3.5 | 4.3 | 5 | 4.7 |
| Comparative Example R | 4.9:4.6:10.4 | 3.8 | 5 | 4.4 |

Table 5 illustrates the unexpected result that phosphonoalkane carboxylic acid in combination with sulfonate/acrylate copolymer and acrylate homopolymer is more effective at removing scale from glass and plastic than other phosphonates. The compositions of Examples 1-3, which included phosphonoalkane carboxylic acid, all had acceptable scale ratings for both glass and plastic.

By comparison, the compositions of Comparative Examples J-L included varying amounts of 1-hydroxy ethylidene-1,1-diphosphonic acid. While the composition of Comparative Example K had an acceptable plastic scale rating, all of the compositions of Comparative Examples J-L have unacceptable glass and average scale ratings. Thus, while 1-hydroxy ethylidene-1,1-diphosphonic acid may be effective at removing scale from plastic when used in conjunction with a particular ratio of sulfonate/acrylate copolymer to acrylate homopolymer, 1-hydroxy ethylidene-1,1-diphosphonic acid would not generally be effective in removing scale in combination with a sulfonate/acrylate copolymer and an acrylate homopolymer.

The compositions of Comparative Examples M-O included varying amounts of diethylenetriamine penta(methylenephosphonic) acid. As can be seen in Table 5, all of the compositions of Comparative Examples M-O had unacceptable glass, plastic and average scale ratings of greater than 4. Thus, diethylenetriamine penta(methylenephosphonic) acid would not be effective in removing scale in combination with a sulfonate/acrylate copolymer and an acrylate homopolymer.

The compositions of Comparative Examples P-R included varying amounts of hexamethylenediamine tetra(methylenephosphonic) acid. Substantially no scale was removed from glass or plastic using the compositions of Comparative Examples P-R as a threshold system. Thus, hexamethylenediamine tetra(methylenephosphonic) acid would not be effective in removing scale in combination with a sulfonate/acrylate copolymer and an acrylate homopolymer.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. A detergent concentrate comprising:
   (a) an alkalinity source consisting of an alkali metal hydroxide constituting between about 1% and about 75% by weight of the detergent concentrate;
   (b) a nonionic surfactant system constituting between about 0.05% and about 25% by weight of the detergent concentrate;
   (c) a threshold system constituting between about 0.0005% and about 30% by weight of the detergent concentrate; wherein the threshold system comprises a sulfonate/acrylate copolymer consisting essentially of a copolymer of acrylic acid and 2-acrylamido-2-methylpropane sulfonic acid, an acrylate homopolymer and a phosphonoalkane carboxylic acid, wherein the phosphonalkane carboxylic acid constitutes between about 5% to about 30% by weight of the threshold system, wherein the threshold system has a sulfonate/acrylate copolymer to acrylate homopolymer weight ratio of between about 2:1 and about 1:2 and has an acrylate homopolymer to phosphonoalkane carboxylic acid weight ratio of between about 4:1 and 1:1; and wherein the concentrated detergent concentrate is in the form of a cast solid block: and further wherein the detergent concentrate when diluted with water to form a use solution has a pH of greater than 10.

2. The detergent concentrate of claim 1, wherein the threshold system has a sulfonate/acrylate copolymer to acrylate homopolymer weight ratio of about 1:1.

3. The detergent concentrate of claim 1, wherein the threshold system constitutes between approximately 1% and 20% by weight of the detergent concentrate.

4. The detergent concentrate of claim 1, wherein the threshold system constitutes between approximately 1% and 10% by weight of the detergent concentrate.

5. The detergent concentrate of claim 1, wherein the phosphonoalkane carboxylic acid constitutes between about 0.1% to about 3.5% by weight of the detergent concentrate.

6. The detergent concentrate of claim 1, wherein the phosphonoalkane carboxylic acid constitutes between about 0.1% to about 2% by weight of the detergent concentrate.

7. The detergent concentrate of claim 1, wherein the phosphorous content of the detergent concentrate does not exceed 0.5%.

* * * * *